(12) United States Patent
Tian et al.

(10) Patent No.: US 12,169,523 B2
(45) Date of Patent: Dec. 17, 2024

(54) QUERY CONVERSION FOR DIFFERENT GRAPH QUERY LANGUAGES

(71) Applicant: Microsoft Technology Licensing, LLC, Redmond, WA (US)

(72) Inventors: Siming Tian, Redmond, WA (US); Xin Zhang, San Jose, CA (US); Yi Zeng, Bothell, WA (US); Yang Yang, Redmond, WA (US); Daxin Jiang, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/920,215

(22) PCT Filed: Mar. 24, 2021

(86) PCT No.: PCT/US2021/023797
§ 371 (c)(1),
(2) Date: Oct. 20, 2022

(87) PCT Pub. No.: WO2021/242382
PCT Pub. Date: Dec. 2, 2021

(65) Prior Publication Data
US 2023/0342396 A1 Oct. 26, 2023

(30) Foreign Application Priority Data
May 28, 2020 (CN) .......................... 202010469919.0

(51) Int. Cl.
*G06F 7/00* (2006.01)
*G06F 16/901* (2019.01)
*G06F 16/9032* (2019.01)

(52) U.S. Cl.
CPC ...... *G06F 16/9032* (2019.01); *G06F 16/9027* (2019.01)

(58) Field of Classification Search
CPC ............. G06F 16/9027; G06F 16/9024; G06F 16/9032; G06F 16/24542; G06F 16/24534
USPC ................ 707/769, 770, 771, 736, 739, 798
See application file for complete search history.

(56) References Cited

U.S. PATENT DOCUMENTS

| 9,448,995 | B2 | 9/2016 | Kurz | |
| 10,713,252 | B1* | 7/2020 | Bourne | G06F 16/9024 |
| 2014/0244687 | A1 | 8/2014 | Shmueli et al. | |
| 2017/0364694 | A1* | 12/2017 | Jacob | G06F 16/24542 |

(Continued)

FOREIGN PATENT DOCUMENTS

| CN | 110543585 A | 12/2019 |
| CN | 110795456 A | 2/2020 |

OTHER PUBLICATIONS

"Second Office Action Issued in Chinese Patent Application No. 202010469919.0", dated Jun. 5, 2023, 9 Pages.

(Continued)

*Primary Examiner* — Md I Uddin
(74) *Attorney, Agent, or Firm* — Schwegman Lundberg Woessner, P.A.

(57) ABSTRACT

The present disclosure provides method and apparatus for query conversion. A first query for a first graph database may be obtained. A syntax tree may be generated through parsing the first query. A query graph may be created based on the syntax tree. The query graph may be converted into a second query for a second graph database.

12 Claims, 7 Drawing Sheets

(56) References Cited

U.S. PATENT DOCUMENTS

2018/0210966 A1 7/2018 Bedi et al.
2018/0276273 A1 9/2018 Mittal et al.
2018/0314729 A9 11/2018 Reschke et al.

OTHER PUBLICATIONS

"DB-Engines Ranking of Graph DBMS", Retrieved From: https://web.archive.org/web/20191205034556/https:/db-engines.com/en/ranking/graph+dbms, Dec. 5, 2019, 2 Pages.

Chen, et al., "Sequence-to-Action: End-to-End Semantic Graph Generation for Semantic Parsing", In Repository of arXiv:1809.00773v1, Sep. 4, 2018, 12 Pages.

Huang, et al., "Natural Language to Structured Query Generation via Meta-Learning", In Repository of arXiv:1803.02400v4, Jul. 18, 2018, 9 Pages.

"International Search Report and Written Opinion Issued in PCT Application No. PCT/US21/023797", dated Jun. 9, 2021, 12 Pages.

Prud'Hommeaux, et al., "SPARQL Query Language for RDF", Retrieved From: https://www.w3.org/TR/rdf-sparql-query/, Jan. 15, 2008, 83 Pages.

Sharef, et al., "Natural Language Query Translation for Semantic Search", In International Journal of Digital Content Technology and its Applications, vol. 7, Issue 13, Sep. 2013, 11 pages.

Song, et al., "Semantic query graph based SPARQL generation from natural language questions", In Journal of Cluster Computing, vol. 22, Issue 5, Jan. 2019, pp. 847-858.

Thakkar, et al., "Direct Mappings between RDF and Property Graph Databases", In Repository of arXiv:1912.02127, Dec. 4, 2019, pp. 1-31.

Thakkar, et al., "Let's build Bridges, not Walls: SPARQL Querying of TinkerPop Graph Databases with Sparql-Gremlin", In Proceeding of IEEE 14th International Conference on Semantic Computing, Feb. 3, 2020, pp. 408-415.

"Office Action Issued in Chinese Patent Application No. 202010469919.0", dated Jan. 19, 2023, 7 Pages.

Notice of Allowance Received for Chinese Application No. 202010469919.0, mailed on Mar. 8, 2024, 4 pages (English Translation Provided).

Office Action Received for Chinese Application No. 202010469919.0, mailed on Dec. 11, 2023, 8 pages (English Translation Provided).

* cited by examiner

QUERY CONVERSION FOR DIFFERENT GRAPH QUERY LANGUAGES

CROSS-REFERENCE TO RELATED APPLICATION

This application is a U.S. National Stage Filing under 35 U.S.C. 371 of International Patent Application Serial No. PCT/US2021/023797, filed Mar. 24, 2021, and published as WO 2021/242382 A1 on Dec. 2, 2021, which application claims the benefit of priority to Chinese Patent Application No. 202010469919.0, filed May 28, 2020, which applications and publication are incorporated herein by reference in their entirety.

BACKGROUND

A graph database is a non-relational database designed to use graph structure for semantic query. The graph database can be widely used in various fields such as knowledge graphs, financial risk control, and social relations. Mainstream graph databases include graph databases based on Resource Description Framework (RDF) graph models, graph databases based on Labeled Property Graph (LPG) graph models, etc. The graph databases based on RDF graph models usually employ SPARQL as a graph query language, which is a standard query language recommended by the World Wide Web Consortium (W3C). Graph query languages employed by the graph databases based on LPG graph models vary depending on different graph databases. For example, the Neo4j graph database employs Cypher as the graph query language, while graph databases such as Microsoft Azure Cosmos DB, JanusGraph, Amazon Neptune, etc. employ Gremlin as the graph query language.

SUMMARY

This Summary is provided to introduce a selection of concepts that are further described below in the Detailed Description. It is not intended to identify key features or essential features of the claimed subject matter, nor is it intended to be used to limit the scope of the claimed subject matter.

Embodiments of the present disclosure provide method and apparatus for query conversion. A first query for a first graph database may be obtained. A syntax tree may be generated through parsing the first query. A query graph may be created based on the syntax tree. The query graph may be converted into a second query for a second graph database.

It should be noted that the above one or more aspects comprise the features hereinafter fully described and particularly pointed out in the claims. The following description and the drawings set forth in detail certain illustrative features of the one or more aspects. These features are only indicative of the various ways in which the principles of various aspects may be employed, and this disclosure is intended to include all such aspects and their equivalents.

BRIEF DESCRIPTION OF THE DRAWINGS

The disclosed aspects will hereinafter be described in connection with the appended drawings that are provided to illustrate and not to limit the disclosed aspects.

DETAILED DESCRIPTION

The present disclosure will now be discussed with reference to several example implementations. It is to be understood that these implementations are discussed only for enabling those skilled in the art to better understand and thus implement the embodiments of the present disclosure, rather than suggesting any limitations on the scope of the present disclosure.

As the LPG graph model is closer to the real graph compilation structure and the query efficiency is higher, more and more graph database providers try to migrate their products from graph databases based on RDF graph models to graph databases based on LPG graph models. For the sake of brevity, the graph database based on the RDF graph model is abbreviated as a RDF graph database, and the graph database based on the LPG graph model is abbreviated as a LPG graph database hereinafter. The migration from a RDF graph database to a LPG graph database involves migration of data level and migration of graph query language level. For the migration of graph query language level, a query using a graph query language supported by the RDF graph database, such as SPARQL, needs to be converted into a query using a graph query language supported by the LPG graph database, such as Cypher, Gremlin, etc. Since the LPG graph databases do not use a unified graph query language, query conversion is usually performed for a specific graph query language. For example, for a specific graph query language supported by a target LPG graph database, a query using SPARQL can be manually rewritten to a query using the specific graph query language. Alternatively, a conversion logic for a specific graph query language can also be used to convert a query using SPARQL into a query using the specific graph query language. The conversion logic includes a large number of mapping configurations for mapping terms and syntax supported by SPARQL to the terms and syntax supported by the specific graph query language. The above method requires familiarity with the SPARQL graph query language and takes up a lot of resources and time, and cannot be universally applied to all LPG graph query languages.

Embodiments of the present disclosure propose a convenient and universal method for converting SPARQL queries into different LPG queries. Herein, a query using a SPARQL graph query language is referred to as a SPARQL query, and a query using a LPG graph query language is referred to as a LPG query, wherein the LPG graph query language is a general designation of graph query languages, such as Cypher, Gremlin, etc., supported by various LPG graph databases.

In one aspect, the embodiments of the present disclosure propose to convert a SPARQL query into a LPG query through creating a query graph corresponding to the SPARQL query. Herein, a query graph refers to a graph-like structure that expresses query intent through graphical elements such as nodes and edges, which may also be referred to as an abstract query graph. The query graph according to the embodiments of the present disclosure may present entities, constraints, computation logics, etc. included in a SPARQL query as well as complex combinations between them in an intuitive and easy-to-understand manner. Through analyzing the query graph created according to the embodiments of the present disclosure, the SPARQL query may be accurately and conveniently converted into any kind of LPG query.

In another aspect, the embodiments of the present disclosure propose to consider an ontology file, e.g., an owl file, associated with a graph database for a SPARQL query when creating a query graph corresponding to the SPARQL query. The ontology file may be parsed to obtain a data structure (schema) corresponding to the graph database. When creating the query graph, using this data structure may ensure the accuracy and scalability of node types, edge types, data types, etc. included in the query graph.

In yet another aspect, the embodiments of the present disclosure propose to improve a created query graph to obtain a more efficient query graph. For example, a direction of a query path can be adjusted based on a number of nodes traversed in the query execution process to reduce the query complexity, thereby obtaining a more efficient query graph.

It should be appreciated that although the foregoing discussion and the following discussion involve examples of converting a SPARQL query into a LPG query, the embodiments of the present disclosure are not limited to this, but may be performed in a similar manner conversion between queries using other graph query languages.

Figure 1:
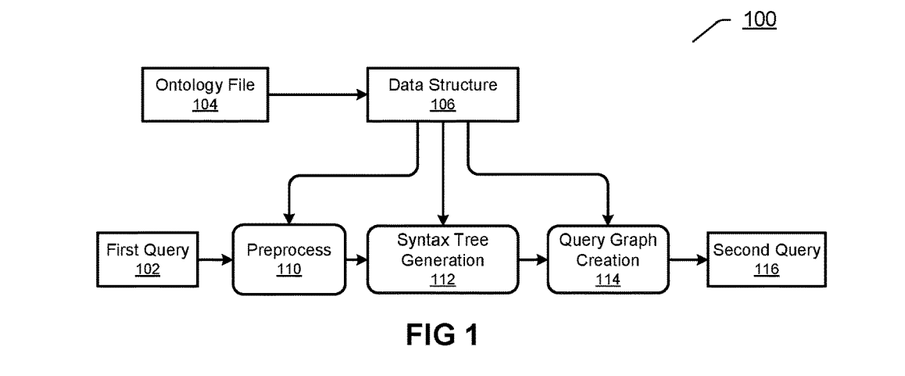
FIG. 1 illustrates an exemplary process for query conversion according to an embodiment of the present disclosure.

FIG. 1 illustrates an exemplary process 100 for query conversion according to an embodiment of the present disclosure. The process 100 may convert a first query 102 for a first graph database into a second query 116 for a second graph database. The first graph database may be, for example, a graph database based on a RDF graph model, that is, a RDF graph database, and the second graph database may be, for example, a graph database based on a LPG graph model, that is, a LPG graph database. The first query 102 may use a graph query language supported by the RDF graph database, such as SPARQL, and the second query 116 may use a graph query language supported by the LPG graph database, such as Cypher, Gremlin, etc.

Each SPARQL query contains one or more graph traversal or computation information. Table 1 illustrates an exemplary SPARQL query, which may be used as an example of the first query 102. The first query 102 intends to find "the name of the country with the largest desert in the world".

TABLE 1

PREFIX mso: <http://knowledge.demo.com/mso/>
SELECT DISTINCT ?Name_0
WHERE{
    ?Object_2 mso: type.object.type mso: geography.desert .
    ?Object_2 mso: location.location.area ?LocationArea_3 .
    ?Object_2 mso: location.location.contained_by ?Object_1 .

TABLE 1-continued

?Object_1 mso: type.object.type mso: location.country .
    ?Object_1 mso: type.object.name ?Name_0 .
}
ORDER BY DESC (?LocationArea_3)
LIMIT 1

The sentence "PREFIX mso: <http://knowledge.demo.com/mso/>" specifies that a resource address involved in the first query 102 is "http://knowledge.demo.com/mso/" and is abbreviated as "mso:" in the following sentences. This address is, for example, Internationalized Resource Identifiers (IRI).

The sentence "SELECT DISTINCT ?Name_0" specifies a result variable to be queried as "?Name_0".

The WHERE clause specifies a graph mode to be queried, and each line of which has a triple structure, such as "subject (S)-predicate (P)-object (O)", to describe nodes or connection between the nodes. For example, the first line specifies that a node named "?Object_2" is connected to a node named "mso: geography.desert" through an edge named "type.object.type", the second line specifies a node named "?Object_2" is connected to a node named "?LocationArea_3" through an edge named "location.location.area", etc.

The sentence "ORDER BY DESC (?LocationArea_3)" specifies that the variable "?LocationArea_3" is sorted in descending order.

"LIMIT 1" specifies that the displayed result is limited to one item. Because the query is looking for "the name of the country with the largest desert in the world", only one result needs to be displayed.

After obtaining the first query 102, an ontology file 104, e.g., an owl file, associated with a graph database for the query may be obtained. A data structure 106 corresponding to the graph database may be obtained through parsing the ontology file 104. The data structure 106 may be stored in a memory for subsequent operations.

Optionally, at 110, the first query 102 may be preprocessed to normalize the first query 102. In some embodiments, redundant spaces in the first query 102 may be removed, resource addresses included in the first query 102 may be verified, etc. In addition, the data structure 106 may also be used to preprocess the first query 102, such as adjusting the format of the first query 102, replacing some strings in the first query 102 with strings defined in the data structure 106, formatting some variables in the first query 102 into forms supported in the data structure 106, etc.

Figure 2:
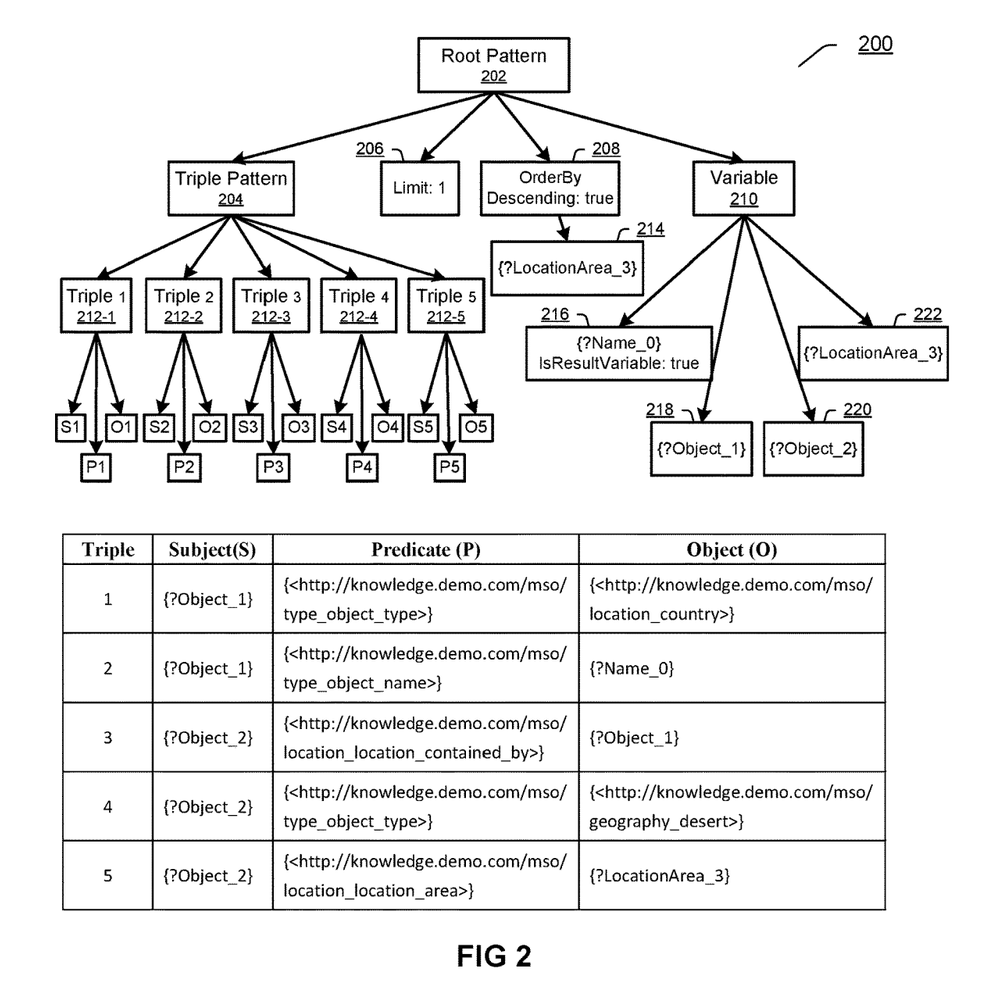
FIG. 2 illustrates an exemplary syntax tree according to an embodiment of the present disclosure.

At 112, a syntax tree may be generated through parsing the preprocessed first query 102. In an implementation, the syntax tree may be generated through parsing the first query 102 using the data structure 106. FIG. 2 illustrates an exemplary syntax tree 200 according to an embodiment of the present disclosure. The syntax tree 200 is generated through parsing the first query 102, for example.

As illustrated in FIG. 2, the syntax tree 200 has a root pattern 202, under which there are a triple pattern 204, computation information 206 and 208, and variables 210.

The triple pattern 204 includes 5 triples extracted from the WHERE clause in a SPARQL query, e.g., the first query 102 in Table 1, which includes, for example, triple 1 212-1, the triplet 2 212-2, the triplet 3 212-3, the triplet 4 212-4, and the triplet 5 212-5. Each triple includes subject (S), predicate (P) and object (O). The table below FIG. 2 illustrates specific information of the subject, predicate, and object in each triple. It should be noted that in the WHERE clause in Table 1, the "http://knowledge.demo.com/mso/" in each predicate and object is abbreviated as "mso:", and information of each predicate and object is presented in a complete form in FIG. 2, for example, "mso: type.object.type" is expanded to "http://knowledge.demo.com/mso/type_object_type".

The computation information 206 and 208 are extracted from the first query 102.

The computation information 206 is, for example, "Limit 1", which is an operation on the result variable "?Name_0". According to an embodiment of the present disclosure, if the computation information is for a result variable, the result variable may not be annotated in the syntax tree to make the expression concise. The computation information 208 is, for example, "OrderBy Descending: true", which is an operation on the variable 214 "?LocationArea_3".

The variable 210 includes 4 variables extracted from the first query 102, which include, for example, the variable 216 "?Name_0", the variable 218 "?Object_1", the variable 220 "?Object_2" and the variable 222 "?LocationArea_3". The variable 216 "?Name_0" is also indicated as "IsResultVariable: true", which indicates that the variable is a result variable.

Figure 3:
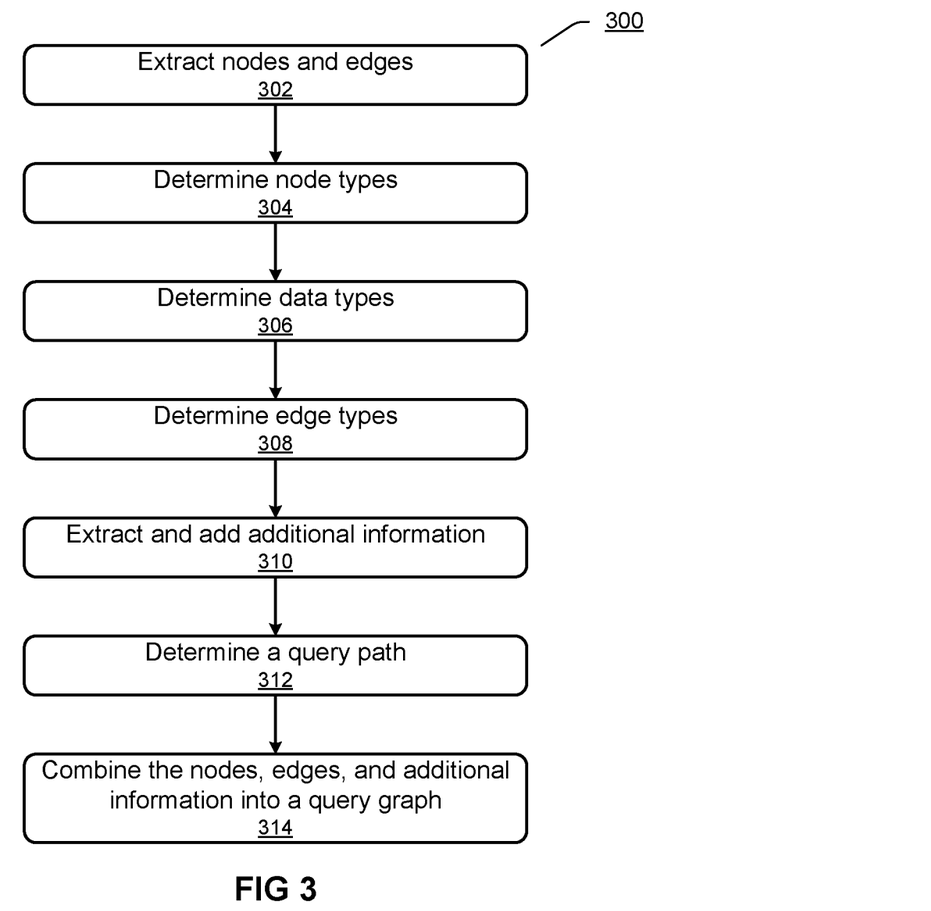
FIG. 3 illustrates an exemplary process for creating a query graph according to an embodiment of the present disclosure.

Referring back to FIG. 1, after the syntax tree is generated, at 114, a query graph may be created based on the generated syntax tree. FIG. 3 illustrates an exemplary process 300 for creating a query graph according to an embodiment of the present disclosure.

At 302, a set of nodes and a set of edges may be extracted from the syntax tree. Taking the syntax tree 200 in FIG. 2 as an example, the following nodes may be extracted from it:

"?Object_1";
"?Object_2";
"?Name_0";
"?LocationArea_3";
"<http://knowledge.demo.com/mso/location_country>"; and
"<http://knowledge.demo.com/mso/geography_desert>".

In addition, the following edges may also be extracted from the syntax tree 200:

"<http://knowledge.demo.com/mso/type_object_type>";
"<http://knowledge.demo.com/mso/type_object_name>";
"<http://knowledge.demo.com/mso/location_location_contained_by>";
"<http://knowledge.demo.com/mso/type_object_type>"; and
"<http://knowledge.demo.com/mso/location_location_area>".

At 304, a node type of each node in the extracted set of nodes may be determined from the syntax tree. The node types may include, for example, an entity node, a variable node, and a value node. The entity node represents a specific entity, which contains all the information related to the entity. The variable node represents a property of an entity node. The value node represents values of a property of an entity node, which may also act as a constraint on the entity node. In an implementation, the node type may be determined through matching a syntax tree, such as the syntax tree 200 in FIG. 2, with a data structure corresponding to the syntax tree, such as the data structure 106 in FIG. 1. For example, for a specific node, the type of the specific node may be determined through matching information about the specific node extracted from the syntax tree 200 with information about various types of nodes defined in the data structure 106. Continuing the above example, the nodes "?Object_1" and "?Object_2" may be determined as entity nodes, the nodes "?Name_0" and "?LocationArea_3" may be determined as variable nodes, and the node "<http://knowledge.demo com/mso/location_country>" and "<http://knowledge.demo.com/mso/geography_desert>" may be determined as value nodes.

In an implementation, if a node type of a node is determined to be a variable node, it may be further determined whether the node is a target variable node. Herein, a target variable node refers to a variable node in a result list of a query. It may be determined, for example, that the variable node is the target variable node in response to determining that a variable represented by the variable node is a result variable. A syntax tree may be used to determine whether a variable is a result variable. Continuing to take the syntax tree 200 in FIG. 2 as an example, the variable "?Name_0" is indicated as the result variable, so the variable node "?Name_0" corresponding to it may be determined as the target variable node. The node determined as the target variable node may be added into a to-be-displayed property list in the query graph.

According to an embodiment of the present disclosure, if a node type of a node is determined to be a variable node, at 306, a data type of data stored by the node may be further determined. In some embodiments, the data type may be determined through matching a syntax tree, such as the syntax tree 200 in FIG. 2, with a data structure corresponding to the syntax tree, such as the data structure 106 illustrated in FIG. 1. For example, for a specific node, a type of data stored by the specific node may be determined through matching information about the data stored by the specific node extracted from the syntax tree 200 with information about various data types defined in the data structure 106. The determined data type may be added to the corresponding node in the query graph.

At 308, an edge type of each edge in the set of edges extracted at 302 may be determined from the syntax tree. The edge type of each edge may be determined according to a node to which the edge points. Edge types may include, for example, an edge pointing to an entity node, an edge pointing to a variable node, and an edge pointing to a value node. In an implementation, the edge type may be determined through matching a syntax tree, such as the syntax tree 200 in FIG. 2, with a data structure corresponding to the syntax tree, such as the data structure 106 in FIG. 1. For example, for a specific edge, the type of the specific edge can be determined through matching information about the specific edge extracted from the syntax tree 200 with information about various types of edges defined in the data structure 106. Continuing the above example, the edge type of the edge "<http://knowledge.demo.com/mso/type_object_type>" may be determined as the edge pointing to a value node, the edge type of the edge "<http://knowledge.demo.com/mso/type_object_name>" may be determined as the edge pointing to a variable node, and the edge type of the edge "<http://knowledge.demo.com/mso/location_location_contained_by>" may be determined as the edge pointing to an entity node.

At 310, additional information may be extracted from the syntax tree, which includes, for example, computation information, aggregation information, and constraint information. Computation information is usually bound to a variable node, and is used to specify computation operations associated with the variable node, such as sorting, offset, limit, etc. The aggregation information specifies aggregation operations, such as summation operations, averaging operations, etc. The constraint information specifies conditions that should be met when performing graph traversal, such as associated value nodes, comparison operations, logical operations, filtering operations, etc.

At 312, a query path may be determined based on the extracted set of nodes and corresponding node types, and the extracted set of edges and corresponding edge types. In an implementation, the query path may be determined based on a predetermined search algorithm. The predetermined search algorithm may determine the query path based on efficiency of query execution. For example, the Depth First Traversal algorithm may be used to determine the query path. Further, the determined query path may also be adjusted based on a number of nodes traversed during query execution, so as to improve the efficiency of query execution. Specific examples of query path adjustment will be described later in conjunction with FIGS. 5A and 5B.

At 314, the nodes, edges, and additional information extracted from the syntax tree may be combined into the query graph according to the query path determined at 312.

It should be appreciated that the process 300 in FIG. 3 is only an example of the process for creating a query graph. According to actual application requirements, the process for creating the query graph may include any other steps, and may include more or fewer steps. In addition, the specific order or hierarchy of the steps in the process 300 is only exemplary, and the process for creating the query graph may be performed in an order different from the described order.

Figure 4:
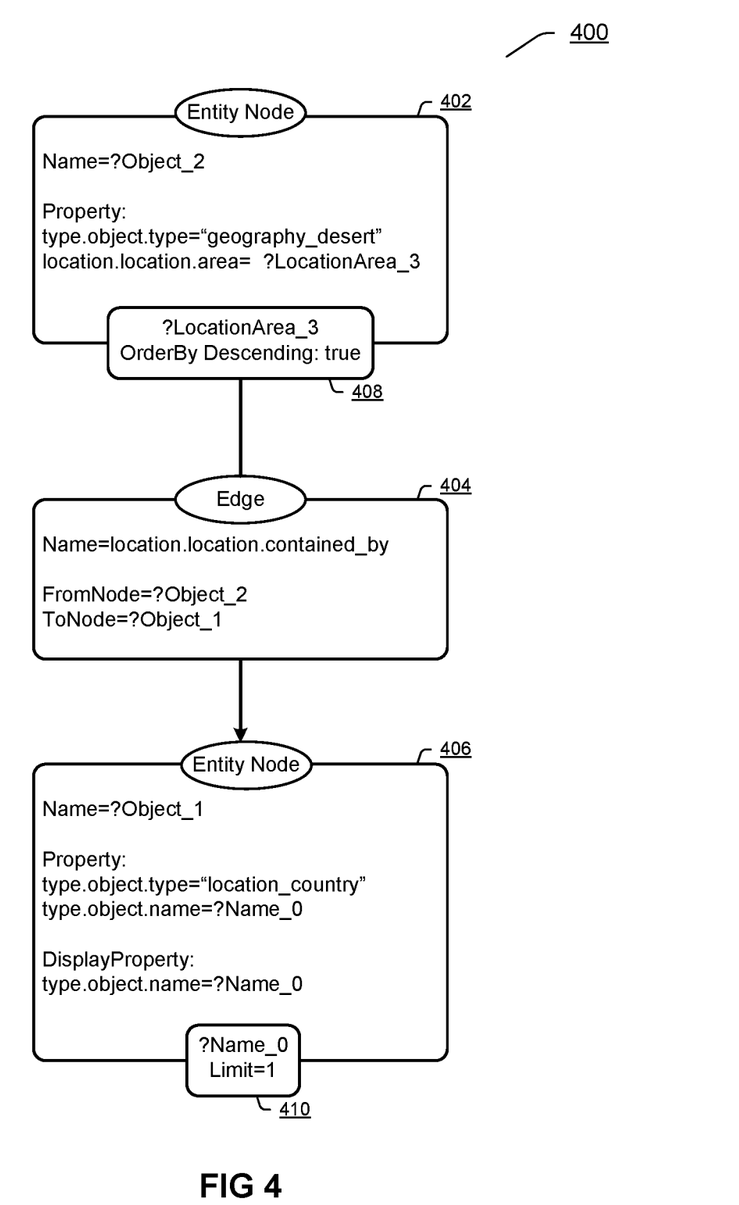
FIG. 4 illustrates an exemplary query graph according to an embodiment of the present disclosure.

FIG. 4 illustrates an exemplary query graph 400 according to an embodiment of the present disclosure. The query graph 400 is created, for example, based on the syntax tree 200 illustrated in FIG. 2 through the process illustrated in FIG. 3. As illustrated in FIG. 4, the query graph 400 is a directed acyclic graph, which includes entity nodes 402 and 406 and an edge 404 pointing to the entity node.

The name of the entity node 402 is "?Object_2". The entity node has a property named "type.object.type", and a value node representing values of the property is "geography_desert", which indicates that a type of the entity node is desert. The entity node may also access a variable node named "?LocationArea_3" through a edge named "location.location.area", the variable node representing an area of the desert.

The name of the entity node 406 is "?Object_1". The entity node has a property named "type.object.type", and a value node representing values of the property is "location_country", which indicates that a type of the entity node is a country. The entity node may also access a variable node named "?Name_0" through an edge named "type.object.name", the variable node representing the name of the country. In addition, a to-be-displayed property list (DisplayProperty) of the entity node includes a variable node "?Name_0", which indicates that the variable node is a target variable node.

The name of the edge 404 pointing to the entity node is "location.location.contained_by", which is used to connect the entity node 402 and the entity node 406 and clarifies the direction of the query path, that is, the entity node 402 is the starting node and the entity node 406 is the termination node. The edge 404 indicates that deserts indicated by the entity node 402 are contained by countries indicated by the entity node 406.

A block 408 contains computation information associated with the entity node 402, for example, arranging the variable "?LocationArea_3" in descending order.

A block 410 contains computation information associated with the entity node 406, for example, limiting the value of the result variable "?Name_0" to one item.

It should be appreciated that the query graph 400 illustrated in FIG. 4 is only exemplary. According to actual application requirements, the query graph may include any other information, and may include more or less information. For example, the data type of the data stored in each variable node may also be included in the query graph, etc.

It can be seen from FIG. 4 that the query graph 400 may present the entities, constraints, computation logics, etc. included in the SPARQL query as well as complex combinations between them in an intuitive and easy-to-understand manner. Through analyzing the query graph, the SPARQL query may be converted into any kind of LPG query accurately and conveniently. Referring back to FIG. 1, after the query graph is created, the created query graph may be converted into the second query 116. The second query 116 may be, for example, a query using any LPG graph query language, such as Cypher, Gremlin, etc. Table 2 is an example of the second query 116 converted from the query graph 400 using the Gremlin graph query language.

TABLE 2 g.V( ).as(' id').has(' type.object.type',' geography.desert').has('
location.location.area').order( ).by(' location.location.area', decr). outE ('
location.location.contained_by').inV( ).has(' type.object.type, ' location.country').has('
type.object.name').as(' Name_0').select(' id',' Name_0').by(' id').by('
type.object.name').limit(1).dedup( )

It should be appreciated that the process for query conversion described above in conjunction with FIG. 1 to FIG. 4 is only exemplary. According to actual application requirements, the process for query conversion may include any other steps, and may include more or fewer steps. For example, although in the above description, the first query is preprocessed, in some embodiments, the syntax tree may be generated directly through parsing the first query without preprocessing.

Figure 5A:
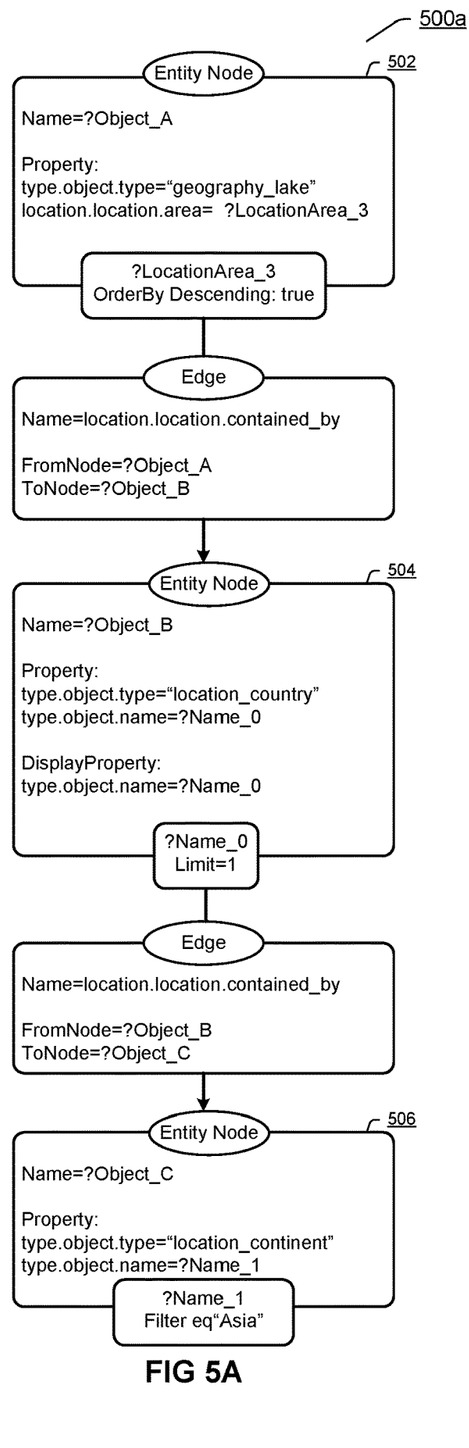
FIGS. 5A-5B illustrate improvements to a query graph according to an embodiment of the present disclosure.
Figure 5B:
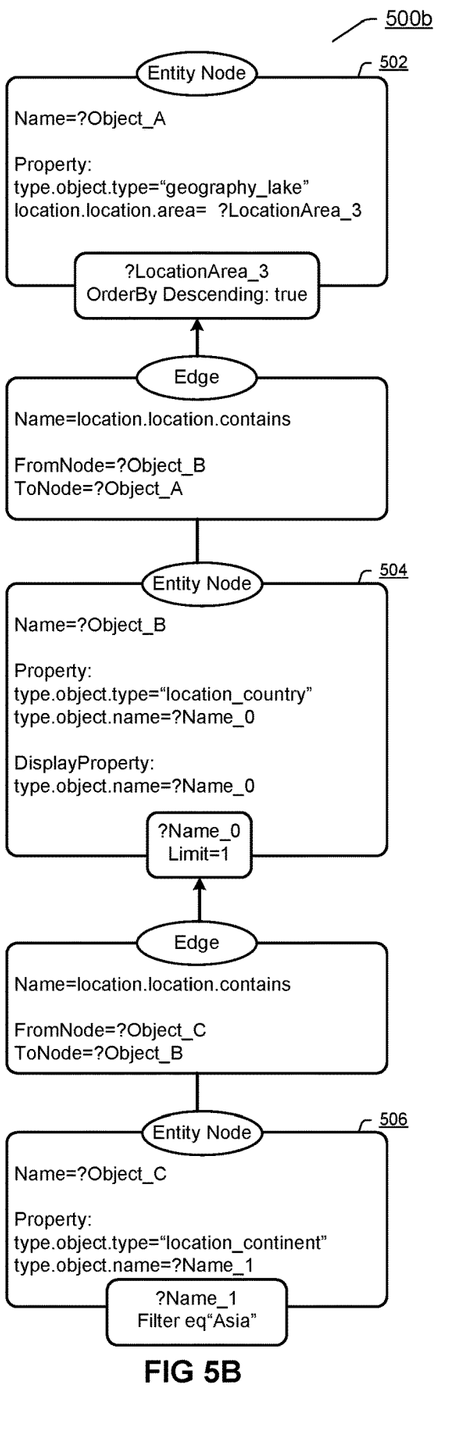

The embodiments of the present disclosure propose that the created query graph may be improved to obtain a more efficient query graph. In an implementation, a more efficient query graph may be generated according to an out-degree and an in-degree of each entity node in the query graph. Herein, an out-degree of an entity node refers to a number of edges that start from the entity node, and an in-degree of an entity node refers to a number of edges that end in the entity node. FIGS. 5A-5B illustrate improvements to a query graph according to an embodiment of the present disclosure.

FIG. 5A illustrates an exemplary query graph 500a according to an embodiment of the present disclosure. The query graph 500a is created, for example, based on a SPARQL query for finding "the name of the country with the largest lake in Asia" through the process 100 in FIG. 1. The query graph 500a has three types of entity nodes, for example, an entity node 502 of a lake type, an entity node 504 of a country type, and an entity node 506 of a continent type. The current query path is "lakes—contained by→countries—contained by→continents". The query path indicates that lakes indicated by the entity node 502 are contained by countries indicated by the entity node 504, and the countries are contained by continents indicated by the entity node 506.

Assume that a number of entity nodes of type lake is 10,000, a number of entity nodes of type country is 300, and a number of entity nodes of type continent is 7. According to the above query path, the query graph 500a may start from 10,000 lake entity nodes to find the country entity node where it is located, then from the country entity node to find the continent where it is located, and then filter out the countries in Asia and sort the lake area to obtain the final answer. The query execution process needs to traverse tens of thousands of entity nodes, and its efficiency is low.

FIG. 5B illustrates an exemplary query graph 500b according to an embodiment of the present disclosure. The query graph 500b is an improvement of the query graph 500a using a predetermined search algorithm. The predetermined search algorithm may adjust the query path based on a number of nodes traversed during query execution, so as to improve the efficiency of query execution. As illustrated in the query graph 500b, the adjusted query path is "continents—contains→countries—contains→lakes". The query path indicates that the continents indicated by the entity node 506 contain the countries indicated by the entity node 504, and the countries contain the lakes indicated by the entity node 502. The query graph 500b may start from a continent entity node, that is, the entity node named Asia, and find all the country entity nodes it contains, and then start from the country entity nodes to find all lake entity nodes and sort the lake areas to obtain the final answer. Since the query execution process in the query graph 500b may first filter out 1 entity node that meets the conditions from the continent entity nodes and then perform subsequent searches, while the query execution process in the query graph 500a starts with 10,000 lake entity nodes to find the country entity nodes where they are located, starts with the country entity nodes to find the continents where they are located, and then filter, the number of entity nodes traversed by the query execution process of the query graph 500b is much less than that of the query execution process of the query graph 500a. The number of entity nodes traversed. Therefore, the query efficiency of the query graph 500b is significantly higher than that of the query graph 500a.

Table 3 illustrates another example of SPARQL query. The query intends to find "the name of the highest mountain in the province where the Yangtze River and the Yellow River flow together".

TABLE 3

PREFIX mso: <http://knowledge.demo.com/mso/>
SELECT DISTINCT ?Name_0
WHERE{
  ?Object_1 mso: type.object.type mso: geography.river .
  ?Object_1 mso: type.object.name ?Name_1 .
  ?Object_2 mso: type.object.type mso: geography.river .
  ?Object_2 mso: type.object.name ?Name_2 .
  ?Object_1 mso: location.location.contained_by ?Object_3 .
  ?Object_2 mso: location.location.contained_by ?Object_3 .
  ?Object_3 mso: type.object.type mso: location.chinese_province .
  ?Object_3 mso: location.location.contains ?Object_4 .
  ?Object_4 mso: type.object.type mso: geography.mountain .
  ?Object_4 mso: geography.mountain.elevation ?MountainElevation _5 .
  ?Object_4 mso: type.object.name ?Name_0 .
  FILTER(?Name_1 = "the Yangtse River")
  FILTER(?Name_2 = "the Yellow River")
}
ORDER BY DESC (?MountainElevation _5)
LIMIT 1

Figure 6:
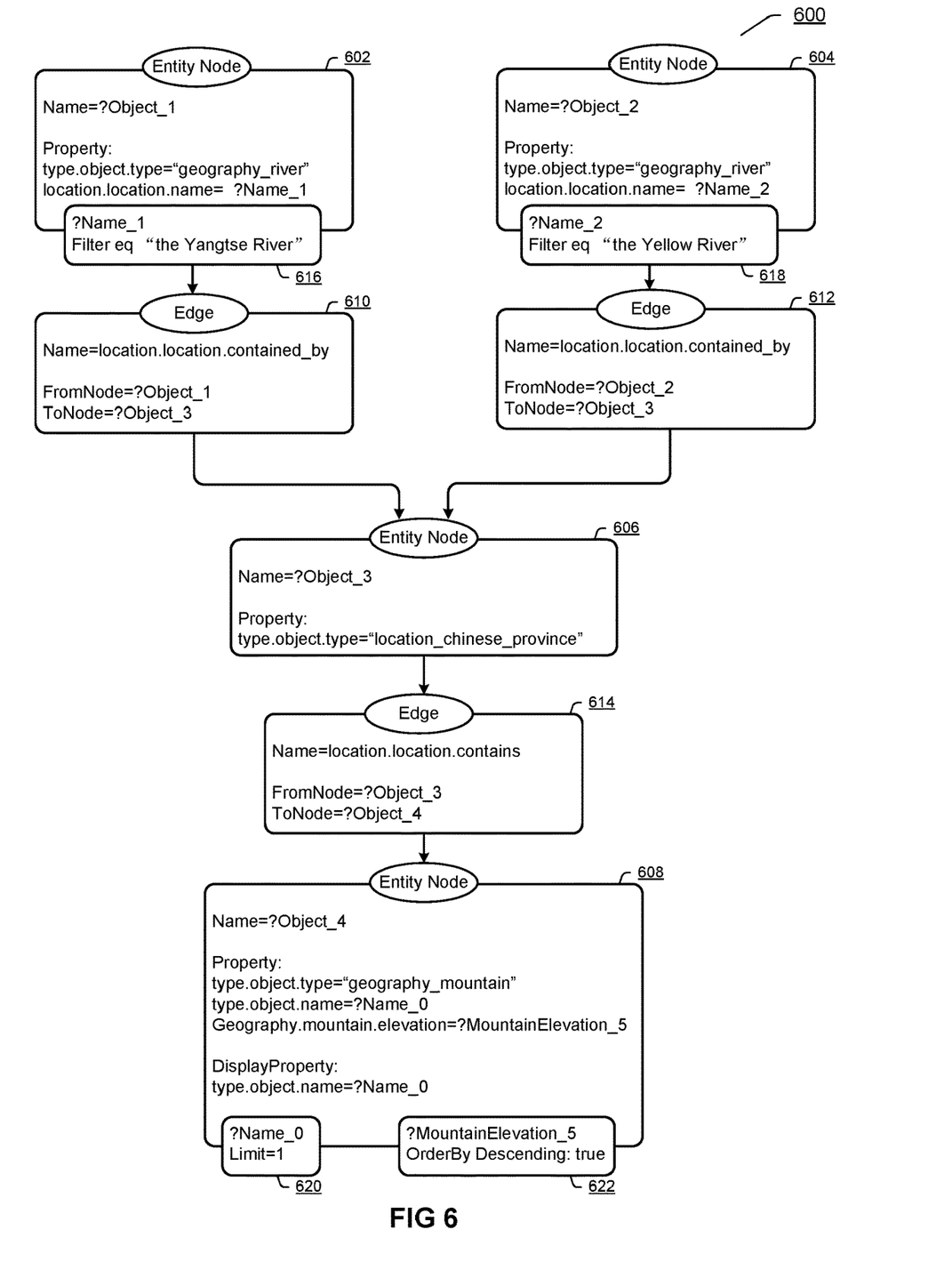
FIG. 6 illustrates another exemplary query graph according to an embodiment of the present disclosure.

FIG. 6 illustrates another exemplary query graph 600 according to an embodiment of the present disclosure. The query graph 600 is created based on the SPARQL query illustrated in Table 3. The query graph 600 may be created, for example, through the process described in conjunction with FIGS. 1 to 4. The query graph 600 includes entity nodes 602, 604, 606, and 608 and edges 610, 612, and 614 that point to the entity nodes.

The name of the entity node 602 is "?Object_1". The entity node has a property named "type.object.type", and a value node representing values of the property is "geography_river", which indicates that the type of the entity node is a river. The entity node may also access a variable node named "?Name_1" through an edge named "location.location.name", the variable node representing the name of the river.

The name of the entity node 604 is "? Object_2". The entity node has a property named "type.object.type", and a value node representing values of the property is "geography_river", which indicates that the type of the entity node is a river. The entity node may also access a variable node named "?Name_2" through an edge named "location.location.name", the variable node representing the name of the river.

The name of the entity node 606 is "? Object_3". The entity node has a property named "type.object.type", and a value node representing values of the property is "location_chinese_province", which indicates that the type of the entity node is a province of China.

The name of the entity node 608 is "?Object_4". The entity node has a property named "type.object.type", and a value node representing values of the property is "geography_mountain", which indicates that the type of the entity node is a mountain. The entity node may access a variable node named "?Name_0" through an edge named "type.object.name", which represents the name of the mountain. The entity node may also access a variable node named "?MountainElevation_5" through an edge named "Geography.mountain.elevation", the variable node representing the height of the mountain. In addition, a to-be-displayed property list of the entity node includes the variable node "?Name_0", which indicates that the variable node is a target variable node.

The name of the edge 610 pointing to the entity node is "location.location.contained_by", which is used to connect the entity node 602 and the entity node 606 and clarifies the direction of the query path, that is, the entity node 602 is the starting node and the entity node 606 is the termination node. The edge 610 indicates that rivers indicated by the entity node 602 are contained by provinces indicated by the entity node 606.

The name of the edge 612 pointing to the entity node is "location.location.contained_by", which is used to connect the entity node 604 and the entity node 606 and clarifies the direction of the query path, that is, the entity node 604 is the starting node and the entity node 606 is the termination node. The edge 612 indicates that rivers indicated by the entity node 604 are contained by provinces indicated by the entity node 606.

The name of the edge 614 pointing to the entity node is "location.location.contains", which is used to connect the entity node 606 and the entity node 608 and clarifies the direction of the query path, that is, the entity node 606 is the starting node and the entity node 608 is the termination node. The edge 614 indicates that provinces indicated by the entity node 606 contain mountains indicated by the entity node 608.

A block 616 contains constraint information associated with the entity node 602, for example, filtering the variable "?Name_1" to filter out the river named "the Yangtze River".

A block 618 contains constraint information associated with the entity node 604, for example, filtering the variable "?Name_2" to filter out the river named "the Yellow River".

A block 620 contains computation information associated with the entity node 608, for example, limiting the value of the result variable "?Name_0" to one item.

A block 622 contains computation information associated with the entity node 608, for example, sorting the variable "?MountainElevation_5" in descending order.

Figure 7:
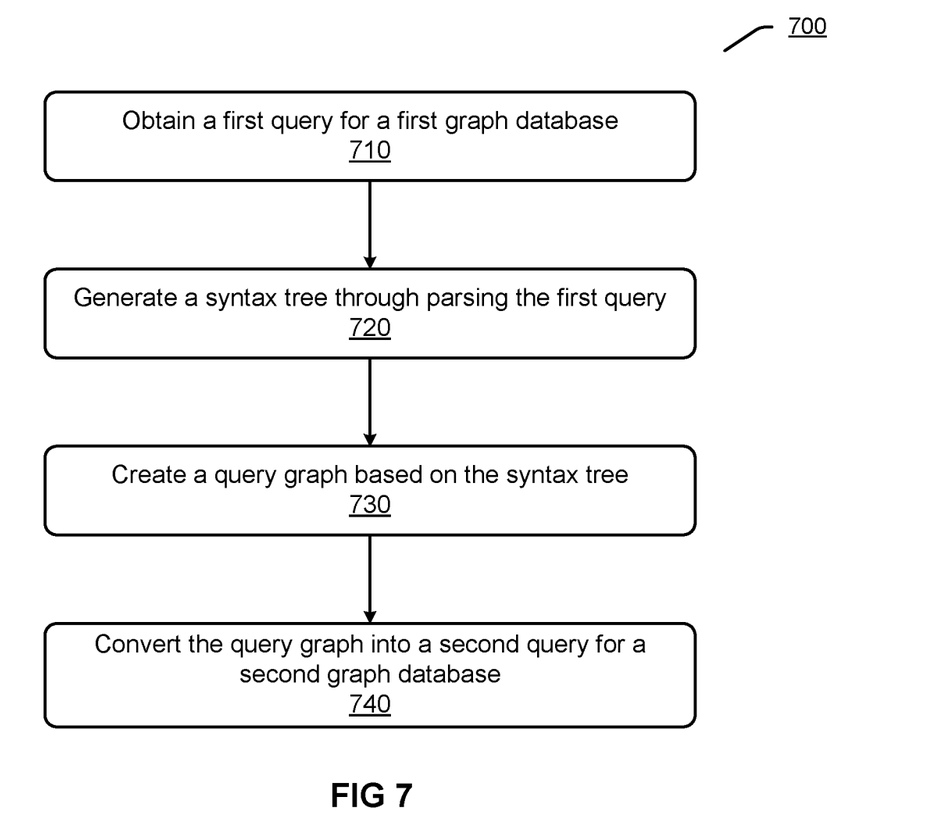
FIG. 7 is a flowchart of an exemplary method for query conversion according to an embodiment of the present disclosure.

FIG. 7 is a flowchart of an exemplary method 700 for query conversion according to an embodiment of the present disclosure.

At step 710, a first query for a first graph database may be obtained.

At step 720, a syntax tree may be generated through parsing the first query.

At step 730, a query graph may be created based on the syntax tree.

At step 740, the query graph may be converted into a second query for a second graph database.

In an implementation, the first query may employ a first graph query language supported by the first graph database, and the second query may employ a second graph query language supported by the second graph database.

In an implementation, the first graph database may be a Resource Description Framework (RDF) graph model-based graph database, and the second graph database may be a Labeled Property Graph (LPG) graph model-based graph database.

In an implementation, the generating a syntax tree may comprise: obtaining an ontology file associated with the first graph database; obtaining a data structure corresponding to the first graph database through parsing the ontology file; and generating the syntax tree through parsing the first query using the data structure.

In an implementation, the creating a query graph may comprise: extracting a set of nodes and a set of edges from the syntax tree; determining a node type of each node in the set of nodes from the syntax tree; determining an edge type of each edge in the set of edges from the syntax tree; determining a query path based on the set of nodes and corresponding node types and the set of edges and corresponding edge types; and combining the set of nodes and the set of edges into the query graph according to the query path.

The node type may include at least one of an entity node, a variable node, and a value node. When the node type of the node is the variable node, the creating a query graph may further comprise: determining that the node is a target variable node; and adding the node into a to-be-displayed property list. When the node type of the node is the variable node, the creating a query graph may further comprise: determining a data type of data stored by the node; and adding the data type to the node.

The determining an edge type may comprise: determining the edge type of the edge according to a node to which the edge points.

The determining a node type and the determining an edge type may be performed at least through matching the syntax tree with the data structure.

The query path may be determined based at least on a predetermined search algorithm. The predetermined search algorithm may be based on a number of nodes traversed during query execution.

The creating a query graph may further comprise: extracting additional information from the syntax tree, the additional information including at least one of computation information, aggregation information, and constraint information; and adding the extracted additional information into the query graph.

In an implementation, the method 700 may further comprise: preprocessing the first query, the preprocessing includes at least one of formatting variables, adjusting formats, replacing strings, removing redundant blanks, and verifying resource addresses.

It should be appreciated that the method 700 may further comprise any steps/processes for query conversion according to the embodiments of the present disclosure as mentioned above.

Figure 8:
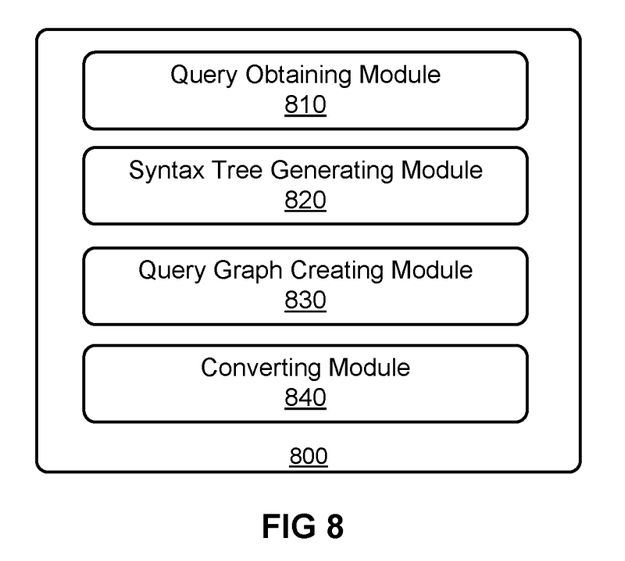
FIG. 8 illustrates an exemplary apparatus for query conversion according to an embodiment of the present disclosure.

FIG. 8 illustrates an exemplary apparatus 800 for query conversion according to an embodiment of the present disclosure. The apparatus 800 may comprise: a query obtaining module 810 for obtaining a first query for a first graph database; a syntax tree generating module 820 for generating a syntax tree through parsing the first query; a query graph creating module 830 for creating a query graph based on the syntax tree; and a converting module 840 for converting the query graph into a second query for a second graph database.

In an implementation, the syntax tree generating module 820 may be further configured for: obtaining an ontology file associated with the first graph database; obtaining a data structure corresponding to the first graph database through parsing the ontology file; and generating the syntax tree through parsing the first query using the data structure.

In an implementation, the query graph creating module 830 may be further configured for: extracting a set of nodes and a set of edges from the syntax tree; determining a node type of each node in the set of nodes from the syntax tree; determining an edge type of each edge in the set of edges from the syntax tree; determining a query path based on the set of nodes and corresponding node types and the set of edges and corresponding edge types; and combining the set of nodes and the set of edges into the query graph according to the query path.

The query graph creating module 830 may be further configured for: extracting additional information from the syntax tree, the additional information including at least one of computation information, aggregation information, and constraint information; and adding the extracted additional information into the query graph.

In an implementation, the apparatus 800 may further comprise a preprocessing module for preprocessing the first query, the preprocessing includes at least one of formatting variables, adjusting formats, replacing strings, removing redundant blanks, and verifying resource addresses.

It should be appreciated that the apparatus 800 may further comprise any modules for performing steps of the methods for query conversion according to the embodiments of the present disclosure as mentioned above.

Figure 9:
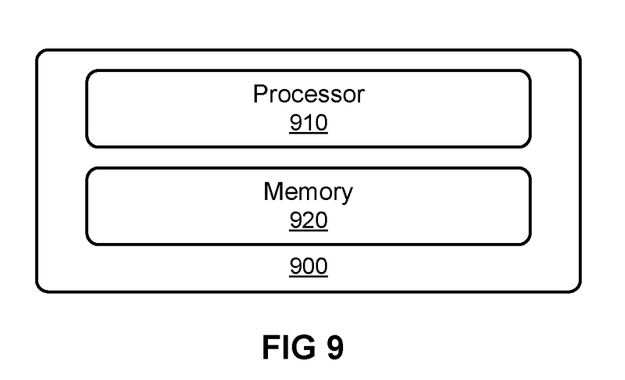
FIG. 9 illustrates an exemplary apparatus for query conversion according to an embodiment of the present disclosure.

FIG. 9 illustrates an exemplary apparatus 900 for query conversion according to an embodiment of the present disclosure.

The apparatus 900 may comprise at least one processor 910 and a memory 920 storing computer-executable instructions. When executing the computer-executable instructions, the at least one processor 910 may perform any operations of the methods for query conversion according to the embodiments of the present disclosure as mentioned above.

The embodiments of the present disclosure may be embodied in a non-transitory computer-readable medium. The non-transitory computer-readable medium may comprise instructions that, when executed, cause one or more processors to perform any operations of the methods for query conversion according to the embodiments of the present disclosure as mentioned above.

It should be appreciated that all the operations in the methods described above are merely exemplary, and the present disclosure is not limited to any operations in the methods or sequence orders of these operations, and should cover all other equivalents under the same or similar concepts.

It should also be appreciated that all the modules in the apparatuses described above may be implemented in various approaches. These modules may be implemented as hardware, software, or a combination thereof. Moreover, any of these modules may be further functionally divided into sub-modules or combined together.

Processors have been described in connection with various apparatuses and methods. These processors may be implemented using electronic hardware, computer software, or any combination thereof. Whether such processors are implemented as hardware or software will depend upon the particular application and overall design constraints imposed on the system. By way of example, a processor, any portion of a processor, or any combination of processors presented in the present disclosure may be implemented with a microprocessor, microcontroller, digital signal processor (DSP), a field-programmable gate array (FPGA), a programmable logic device (PLD), a state machine, gated logic, discrete hardware circuits, and other suitable processing components configured to perform the various functions described throughout the present disclosure. The functionality of a processor, any portion of a processor, or any combination of processors presented in the present disclosure may be implemented with software being executed by a microprocessor, microcontroller, DSP, or other suitable platform.

Software shall be construed broadly to mean instructions, instruction sets, code, code segments, program code, programs, subprograms, software modules, applications, software applications, software packages, routines, subroutines, objects, threads of execution, procedures, functions, etc. The software may reside on a computer-readable medium. A computer-readable medium may include, by way of example, memory such as a magnetic storage device (e.g., hard disk, floppy disk, magnetic strip), an optical disk, a smart card, a flash memory device, random access memory (RAM), read only memory (ROM), programmable ROM (PROM), erasable PROM (EPROM), electrically erasable PROM (EEPROM), a register, or a removable disk. Although memory is shown separate from the processors in the various aspects presented throughout the present disclosure, the memory may be internal to the processors, e.g., cache or register.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein. All structural and functional equivalents to the elements of the various aspects described throughout the present disclosure that are known or later come to be known to those of ordinary skilled in the art are expressly incorporated herein and are intended to be encompassed by the claims.

The invention claimed is:

1. A method for query conversion performed by a computer system employing a processor, the method comprising:
   obtaining, by the computer system, a first query in a first graph query language for a first graph database;
   generating, by the computer system, a syntax tree by:
      obtaining an ontology file associated with the first graph database;
      obtaining a data structure corresponding to the first graph database through parsing the ontology file, and
      generating the syntax tree through parsing the first query using the data structure;
   creating, by the computer system, a query graph based on the syntax tree, wherein the creating the query graph comprises:
      extracting a set of nodes and a set of edges from the syntax tree;
      determining a node type of each node in the set of nodes from the syntax tree;
      determining an edge type of each edge in the set of edges from the syntax tree;
      determining a query path based on the set of nodes and corresponding node types and the set of edges and corresponding edge types; and
      combining the set of nodes and the set of edges into the query graph according to the query path;
   converting, by the computer system, the query graph into a second query for a second graph database, the second query being formatted according to a second graph query language different from the first graph query language, thereby improving interoperability between different graph database systems utilizing different graph query languages; and
   applying the second query to the second graph database to retrieve information from the second graph database.

2. The method of claim 1, wherein the node type includes at least one of an entity node, a variable node, and a value node.

3. The method of claim 2, wherein the node type of the node is the variable node, and the creating the query graph further comprises:
determining that the node is a target variable node; and
adding the node into a to-be-displayed property list.

4. The method of claim 2, wherein the node type of the node is the variable node, and the creating the query graph further comprises:
determining a data type of data stored by the node; and
adding the data type to the node.

5. The method of claim 1, wherein the determining an edge type comprises:
determining the edge type of the edge according to a node to which the edge points.

6. The method of claim 1, wherein the determining a node type and the determining an edge type are performed at least through matching the syntax tree with the data structure.

7. The method of claim 1, wherein the query path is determined based at least on a predetermined search algorithm.

8. The method of claim 7, wherein the predetermined search algorithm is based on a number of nodes traversed during query execution.

9. The method of claim 1, further comprising:
extracting additional information from the syntax tree, the additional information including at least one of computation information, aggregation information, and constraint information; and
adding the extracted additional information into the query graph.

10. The method of claim 1, further comprising:
preprocessing the first query, the preprocessing includes at least one of formatting variables, adjusting formats, replacing strings, removing redundant blanks, and verifying resource addresses.

11. An apparatus for query conversion, comprising:
a query obtaining module for obtaining a first query in a first graph query language for a first graph database;
a syntax tree generating module for generating a syntax tree by:
obtaining an ontology file associated with the first graph database;
obtaining a data structure corresponding to the first graph database through parsing the ontology file; and
generating the syntax tree through parsing the first query using the data structure;
a query graph creating module for creating a query graph based on the syntax tree, wherein the creating the query graph comprises:
extracting a set of nodes and a set of edges from the syntax tree;
determining a node type of each node in the set of nodes from the syntax tree;
determining an edge type of each edge in the set of edges from the syntax tree;
determining a query path based on the set of nodes and corresponding node types and the set of edges and corresponding edge types; and
combining the set of nodes and the set of edges into the query graph according to the query path;
a converting module for converting the query graph into a second query for a second graph database, the second query being formatted according to a second graph query language different from the first graph query language, thereby improving interoperability between different graph database systems utilizing different graph query languages; and
applying the second query to the second graph database to retrieve information from the second graph database.

12. An apparatus for query conversion, comprising:
at least one processor; and
a memory storing computer executable instructions that, when executed, cause the at least one processor to:
obtain a first query in a first graph query language for a first graph database,
generate a syntax tree by:
obtaining an ontology file associated with the first graph database;
obtaining a data structure corresponding to the first graph database through parsing the ontology file, and
generating the syntax tree through parsing the first query using the data structure;
create a query graph based on the syntax tree, wherein the creating the query graph comprises:
extracting a set of nodes and a set of edges from the syntax tree;
determining a node type of each node in the set of nodes from the syntax tree;
determining an edge type of each edge in the set of edges from the syntax tree;
determining a query path based on the set of nodes and corresponding node types and the set of edges and corresponding edge types; and
combining the set of nodes and the set of edges into the query graph according to the query path; and
convert the query graph into a second query for a second graph database, the second query being formatted according to a second graph query language different from the first graph query language, thereby improving interoperability between different graph database systems utilizing different graph query languages; and
apply the second query to the second graph database to retrieve information from the second graph database.

* * * * *